US012435868B2

(12) United States Patent
Gelten et al.

(10) Patent No.: US 12,435,868 B2
(45) Date of Patent: Oct. 7, 2025

(54) LUMINAIRE WITH INTEGRATED RF COMMUNICATION

(71) Applicant: SIGNIFY HOLDING B.V., Eindhoven (NL)

(72) Inventors: Ronald Johannes Gelten, Geldriop (NL); Henricus Mathijs Maria Creemers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/845,025

(22) PCT Filed: Feb. 28, 2023

(86) PCT No.: PCT/EP2023/055001
§ 371 (c)(1),
(2) Date: Sep. 9, 2024

(87) PCT Pub. No.: WO2023/169876
PCT Pub. Date: Sep. 14, 2023

(65) Prior Publication Data

US 2025/0180197 A1 Jun. 5, 2025

(30) Foreign Application Priority Data

Mar. 10, 2022 (EP) .................................... 22161237

(51) Int. Cl.
*F21V 23/04* (2006.01)
*F21S 8/08* (2006.01)
(Continued)

(52) U.S. Cl.
CPC ........ *F21V 23/0435* (2013.01); *F21V 23/008* (2013.01); *H01Q 1/44* (2013.01);
(Continued)

(58) Field of Classification Search
CPC .......... F21V 15/00; F21V 15/01; F21V 15/02; F21V 23/008; F21V 23/0435; F21S 8/085;
(Continued)

(56) References Cited

U.S. PATENT DOCUMENTS 4,656,487 A * 4/1987 Sureau ............... H01Q 15/0013 343/872
9,939,132 B2 * 4/2018 Greenberg .............. F21V 15/00
(Continued)

FOREIGN PATENT DOCUMENTS

CN 204459819 U 7/2015
CN 108730788 A 11/2018
(Continued)

OTHER PUBLICATIONS

URL: https://microcontinuum.com/nanofabrication-technology/transparent-conductive-film, "Nanomesh Transparent Conductive Film," Microcontinuum, 2024 (5 Pages).

*Primary Examiner* — Alexander K Garlen

(57) ABSTRACT

A luminaire comprises an outer housing and a wireless communications module mounted in the outer housing. The outer housing comprises at least first and second portions, wherein the first portion comprises an electrically conductive mesh with a first opening size to provide transparency to RF signals within an operating range of wavelengths of the communications module, and a second portion comprising a solid electrically conductive layer or an electrically conductive mesh with a second opening size, smaller than the first opening size. This second portion is thus optimized for an EM shielding function.

14 Claims, 3 Drawing Sheets

(51) Int. Cl.
*F21V 23/00* (2015.01)
*F21W 131/103* (2006.01)
*H01Q 1/44* (2006.01)
*H05B 47/19* (2020.01)

(52) U.S. Cl.
CPC .............. *H05B 47/19* (2020.01); *F21S 8/085* (2013.01); *F21W 2131/103* (2013.01)

(58) Field of Classification Search
CPC .......... F21S 8/086; F21S 8/088; H01Q 1/526; H01Q 1/44
See application file for complete search history.

(56) References Cited

U.S. PATENT DOCUMENTS

| | | | | |
|---|---|---|---|---|
| 11,248,781 | B1 | 2/2022 | Alexander et al. | |
| 2015/0312967 | A1 | 10/2015 | Qian et al. | |
| 2020/0083600 | A1* | 3/2020 | Hagiwara | H01Q 21/30 |
| 2022/0384933 | A1* | 12/2022 | Choi | H01Q 5/42 |
| 2023/0187822 | A1* | 6/2023 | Sayem | H10F 77/215<br>343/720 |

FOREIGN PATENT DOCUMENTS

| | | | | | |
|---|---|---|---|---|---|
| EP | 4033143 | A1 | | 7/2022 | |
| JP | 2022528569 | A | * | 6/2022 | H01Q 1/526 |
| WO | WO-2022253964 | A1 | * | 12/2022 | H04B 1/38 |

* cited by examiner

LUMINAIRE WITH INTEGRATED RF COMMUNICATION

CROSS-REFERENCE TO PRIOR APPLICATIONS

This application is the U.S. National Phase application under 35 U.S.C. § 371 of International Application No. PCT/EP2023/055001, filed on Feb. 28, 2023, which claims the benefit of European Patent Application No. 22161237.7, filed on Mar. 10, 2022. These applications are hereby incorporated by reference herein.

FIELD OF THE INVENTION

The invention relates to luminaires, especially but not limited to outdoor luminaires, with integrated RF communication capabilities.

BACKGROUND OF THE INVENTION

Along with the development of mobile telecommunication technologies, user data consumption has grown rapidly in the last decade. Thus, a higher download and upload speed and a greater bandwidth are needed to meet user demands.

Wireless connectivity standards and specifications that accommodate these growing needs are driven by standardization bodies such as 3GPP and IEEE. Among the general audience, the 3GPP telecommunication standards of 2G, 3G, 4G and 5 G are most commonly known. An important aspect of the 5 G standard is that higher radio frequencies are used. While the 4G-LTE frequencies range from 700 MHZ-2.7 GHZ, 5 G frequencies are provided in two sets: the first set ranges from 450 MHz to 6 GHz and the second set ranges from 24.25 GHz to 52.6 GHz. Generally speaking, the band of radio frequencies in the electromagnetic spectrum from 30 GHz to 300 GHz is called Extremely High Frequency (EHF). Since the radio waves in this EHF band have wavelengths of the order of millimeters, the EHF band is also called the millimeter band and a radio wave in this band is called a millimeter wave, or mmWave.

A typical mmWave communication device comprises a baseband section for providing different functions, such as a power supply function, an interfacing function, a data storage function and a data processing function, and one or more radio frequency (RF) sections each comprising a transmitter and/or a receiver. The transmitter and/or receiver need to connect to an antenna for transmitting and/or receiving a radio wave. Typically, for frequencies above 6 GHz, physical separation between the radio frequency sections and the antenna should be minimized due to excessive signal losses in the cables otherwise. The baseband section and the radio frequency section(s) can be arranged as a single module or as different modules.

Since a typical mmWave communication device is designed for an outdoor environment, it needs to resist moisture, water, dust, etc., by weatherproofing methods, e.g., by providing a waterproofing encapsulation housing, by providing seals for cable feedthroughs and connectors, and/or by providing separated compartments for different sections.

All the above considerations tend to increase size and weight of mmWave communication devices.

The outdoor lighting grid (e.g. street lighting) offers a near-ideal grid to deploy wireless communication infrastructure (WiFi, telecommunications 4G/5 G, E-band and V-band backhaul) because it offers proximity to people and traffic, it offers large scale due to ubiquitous presence, and it offers suitable granularity (the distance between poles matches the typical requirements of RF network design) as well as suitable elevation (the height to mount equipment for signal coverage).

One key challenge to obtain et acceptance from cities (i.e. permits) and the public is to provide aesthetic solutions and minimized form factors. There is a strong wish to hide technology in unseen places.

These challenges can be met by integrating radio frequency (RF) equipment into luminaires, to create a Gbit-speed mesh network. This network is a transport layer for data coming from IoT sensors, security cameras, WiFi access points and/or telecommunications equipment. Recent developments in equipment for the unlicensed spectrum, specifically the 60 GHz mmWave band, have made such integration possible.

The integration of equipment into luminaires however comes with several challenges. Significant heat dissipation requires the application of heavy heat sinks made of metal (and/or heavy potting material). Antennas require RF transparent materials such as plastic. These antennas typically take the shape of rectangular PCB boards, and typically multiple boards are needed (at least two, preferably four) so as to create all-around 360 degree coverage. Thus, a significant amount of plastic housing is needed, which has a thermally insulating effect.

In addition, in many applications the antennas and other electronic components need to be weather-protected for example with at least an IP66 rating, which requires tight seals which make thermal challenges even greater.

Finally, the high frequency electronics can create significant EM issues. These can be counteracted by using a full metal enclosure, but this reduces options for weight reduction and creates additional challenges to mount the antennas to avoid attenuation by the EM protection.

There is a need for a luminaire design which enables integration of a wireless communications module while addressing these issues.

CN 108730788 A discloses a lighting device comprising a heat dissipation shell accommodating a lighting circuit main base plate and a wireless communication module. The heat dissipation shell is made of metal. A communication window is opened on the heat dissipation shell, and the wireless communication module is arranged corresponding to the communication window in a manner of transmitting wireless signals through the communication window. The lighting device can balance heat dissipation and wireless signal transmission.

SUMMARY OF THE INVENTION

The invention is defined by the claims.

According to the invention, there is provided a luminaire comprising:

an outer housing; and a wireless communications module mounted within a space enclosed by the outer housing, the wireless communications module including an antenna, the wireless communications module having an operating range of wavelengths, wherein the outer housing comprises at least first and second portions, wherein the first portion comprises an electrically conductive mesh with a first opening size to provide transparency to RF signals within the operating range of wavelengths, and a second portion comprising a solid electrically conductive layer or an electrically conductive mesh with a second opening size, smaller than the first opening size.

A "mesh" as used herein is considered a material of open structure made of a network of wire or thread. A mesh may have evenly spaced openings of a certain size.

The first portion allows the transmission and reception of signals from and to the wireless communications module. Thus, it functions as an RF communications window. The overall outer housing functions as a Faraday cage to provide EM shielding to protect the wireless communications module and the other circuitry of the luminaire. The second portion has a smaller mesh size and it provides additional strength as well as providing EM shielding for a broader range of interference wavelengths. The second portion may even be solid, by which is meant there are no openings in the conductive layer, hence the conductive layer (in those locations) is suitable for ingress protection. The second portion may comprise a mesh portion and a solid portion.

In particular, the smaller mesh size means the second portion blocks a larger range of wavelengths (including the wavelength used by the wireless communications module). Thus, it provides improved RF shielding outside the areas where transparency is needed for the wireless communication.

In this way, different parts of the housing have different designs, depending on whether RF signals need to propagate through that part of the housing. The outer housing preferably also provides ingress protection. Ingress protection is for example ensured by additional gaskets. The luminaire is for example an outdoor luminaire.

The structure of the outer housing is lightweight by using a mesh structure, but also enables good thermal dissipation using the conductive material of the mesh structure (which is preferably both electrically and thermally conductive). The luminaire enables a lighting infrastructure to be used for wireless communication, such as WiFi communication, 4G/5 G communication, E-band or V-band for small cell backhaul.

The operating range of wavelengths for example is a range around 5 mm. The second portion for example has mesh openings of 2 mm or less whereas the mesh openings in the first portion are for example larger than 5 mm.

The mesh openings of the first portion are for example located aligned with a field of view of the antenna of the wireless communications module. That is, at least a part of the electrically conductive mesh of the first portion is located or arranged aligned with a field of view of the antenna of the wireless communications module.

Thus, the first portion is used at locations where the antenna signals need to pass. The field of view is for example a horizontal plane around the communications module, with a range above and below the horizontal, for example +−20 degrees.

The first and second portions of the outer housing for example each comprise a wall formed as:

a conductive mesh layer; and a plastic layer against the conductive mesh layer.

The two-layer structure may be used for EM shielding (by virtue of the conductive mesh layer) as well as providing ingress protection and/or shielding against weather influences such as sun (solar load, solar radiation, heat), or hail (impact protection). The combination of conductive layer e.g. metal and plastic gives a reduced weight compared to a full metal housing, but is stronger than a full plastic housing while also enabling EM shielding to be implemented.

The wireless communications module may be on the plastic side of the two-layer structure, or on the mesh side. However, preferably the mesh layer is at the side of the communications module, and the enclosure may also have an electrical grounding function. Thus, it is then easier to make a conductive electrical connection between the communications module and the mesh layer.

The mesh layer may for example connect to other metal parts of the luminaire to provide coupling to a heat sink. Metal parts of the outer housing may act as a heat sink both for the communications module and for other circuitry of the luminaire, such as the LED boards and driver.

The plastic layer is preferably UV resistant. Plastics such as polycarbonates or PMMA may be used, but other plastics may be used. Resin-based materials may also be used.

Another portion of the outer housing may comprise only a conductive mesh layer not having an additional plastic layer against the conductive mesh layer, as described above. This feature may be used to provide ventilation, with other portions of the outer housing comprising a conductive mesh layer with additional plastic layer against the conductive mesh layer preventing debris entering the internal volume of the housing. Alternatively, or additionally, some portions of the mesh may comprise only a conductive mesh layer, i.e., not having an additional plastic layer against the conductive mesh layer, for providing ventilation, with other portions of the mesh comprising a conductive mesh layer with additional plastic layer against the conductive mesh layer for preventing debris entering.

The conductive mesh layer may comprise a metal layer with a thickness in the range 0.5 mm-1.5 mm or a carbon-based layer with a thickness below 1 mm, and the plastic layer may have a thickness in the range 1 mm-3 mm.

The first portion of the electrically conductive mesh may comprise an array of mesh openings having a maximum opening dimension larger than half of the largest wavelength, or larger than the actual largest wavelength, of the operating range of wavelengths. This ensures the wireless communication is not shielded.

The transmission and reception wavelength may correspond to a frequency in the band 57 GHz to 71 GHZ. This band as defined in standard IEEE802.11ad. The frequency band is subdivided into 6 (previously 4) different channels in IEEE 802.11ad, each of them occupy 2160 MHz of space and provide 1760 MHz of bandwidth.

In one example, the luminaire comprises a light source and a light source drive circuit, wherein the outer housing comprises a base part for housing the light source and light source drive circuit and a top part for housing the wireless communications module, wherein the top part includes the first portion and the base part includes the second portion.

Thus, the more open mesh is used over the communications module and the more closed mesh (or solid layer) is used over the other circuitry to provide a wider range of EM shielding without needing to pass the operating wavelengths of the communications module. The luminaire for example has the communications module mounted in its own enclosure on top of the main body (the base part) of the luminaire, which houses the light source and drive circuit.

A solid metal shielding layer may be provided between the base part and the top part. This may function as a heat shield or sun screen which divides the outer housing into top and base parts.

In another example, the luminaire again comprises a light source and a light source drive circuit, but the outer housing has an inner volume containing the light source, light source drive circuit and the communications module. In this design, all the circuitry is within a single shared housing.

The wireless communications module for example comprises the antenna and a RF signal processing circuit. The wireless communications module may comprise an array of antenna boards, each carrying an antenna portion, wherein the antenna portions together define the antenna. The use of multiple boards allows the field of view to be defined, such as a full 360 degree field of view in a horizontal plane.

The antenna boards for example together extend fully around an axis. This enables 360 degree reception and transmission.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
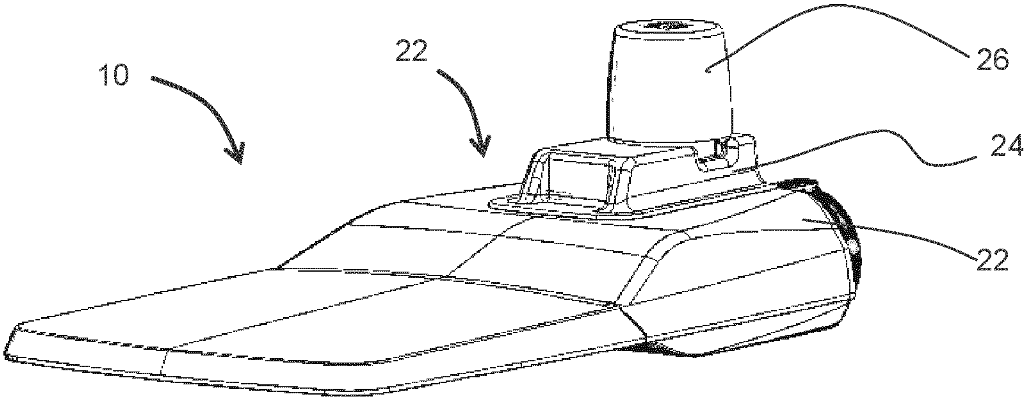
FIG. 1 shows a first design of outdoor luminaire to which the invention may be applied.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a luminaire which comprises an outer housing and a wireless communications module mounted in the outer housing. The outer housing comprises at least first and second portions, wherein the first portion comprises an electrically conductive mesh with a first opening size to provide transparency to an operating range of wavelengths of the communications module, and a second portion comprising a solid electrically conductive layer or an electrically conductive mesh with a second opening size, smaller than the first opening size. This second portion is thus optimized for an EM shielding function.

FIG. 1 shows a first design of outdoor luminaire to which the invention may be applied. The luminaire is for example a street light.

The luminaire 10 comprises an outer housing 20 which includes a base part 22 and a top part 24. The base part houses the light source, for example in the form of a printed circuit board carrying an array of LEDs. Circuitry associated with the light source is also housed in the base part 22 such as a LED driver. FIG. 1 also shows a lighting control unit 26 mounted on top of the outer housing. This enables a standard base part to be used so that the RF function can be provided using existing luminaire components.

The top part 24 houses a wireless RF communications module, such as a typical mmWave (e.g. 60 GHZ) RF communication device. The top part may be a separate component to the base part, mounted on top of the base part. However, they may together be considered to define the outer housing of the luminaire.

In standard designs, the base part 22 is a metal housing to provide EM shielding whereas the top part 24 is a plastic housing to provide transparency to the wireless signals used by the communications module.

Figure 2:
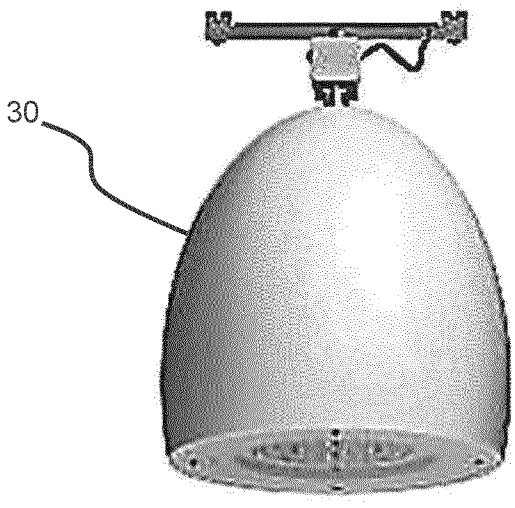
FIG. 2 shows a second design of luminaire to which the invention may be applied

FIG. 2 shows a second design of luminaire to which the invention may be applied, again incorporating wireless communications module. In this design, the components of the luminaire are simply in a shared common housing 30, which in standard designs will therefore need to be transparent to the wireless signals.

The invention provides a material design for the outer housing in which a conductive (e.g. metal) mesh is used for parts of the outer housing around the communications module, and preferably also for parts of the outer housing away from the communications module. This reduces weight compared to a solid metal housing while still providing EM shielding (by selecting the mesh opening size to be smaller than the shortest wavelength to be shielded). Some portions of the outer housing may be formed as a solid conductive housing (i.e. the mesh opening size is zero) so that there may be a combination of a solid area, and areas with two different mesh sizes.

Figure 3:
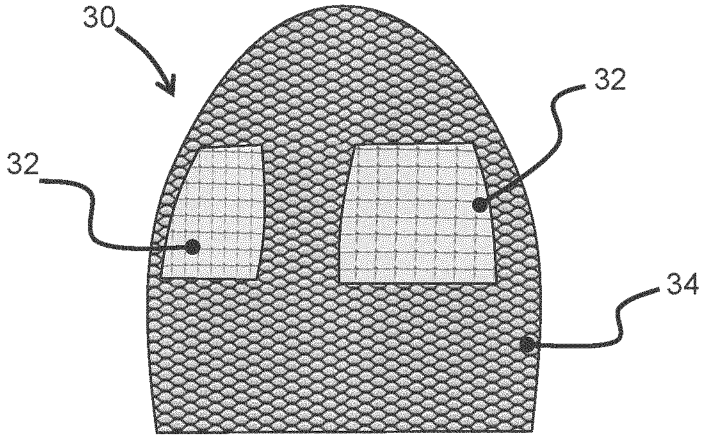
FIG. 3 shows an example of the design for the outer housing of the luminaire of FIG. 2.

FIG. 3 shows an example of the design for the outer housing of the luminaire of FIG. 2.

The outer housing comprises first portions 32 and a second portion 34. The first portions 32 each comprise an electrically conductive mesh with a first opening size to provide transparency to the operating range of wavelengths of the wireless communications module. The mesh openings of the first portion 32 are located aligned with a field of view of the antenna of the wireless communications module. That is, at least a part of the electrically conductive mesh of the first portion 32 is located or arranged aligned with a field of view of the antenna of the wireless communications module.

Multiple first portions 32 may be provided, for example each associated with a different antenna board and aligned with the field of view of that associated antenna.

For 60 GHz mmWave communication (which is generally used to refer to a frequency band 57 GHz to 71 GHZ) the opening size (i.e. the maximum linear dimension of the mesh openings, i.e. diameter for a circle or diagonal for a square) is 5 mm or more, such that the opening size is approximately equal to or larger than the longest wavelength of the RF communication signal.

The second portion 34 may comprise a solid electrically conductive layer, but it is preferred to use an electrically conductive mesh with a second opening size, smaller than the first opening size. For example the mesh opening size may be in the range 1 mm to 2 mm. This blocks the wavelength of the communication signal.

The EM shielding is to prevent the device from emitting so-called spurious signals, in order to comply with both lighting electromagnetic compatibility, EMC, and RF radio rules. The spurious signals are internally generated unwanted signals over a wide frequency band (e.g. 30 MHz to 132 GHz), but of course excluding the intended communication band (57 GHz-71 GHz). The EM shielding also ensures the device is immune to disturbing signals from outside in this frequency range.

In this design, the housing may be formed as a laminar structure comprising the conductive mesh layer (with different mesh opening sizes in different locations) and a plastic layer against the conductive mesh layer. The plastic layer is for example UV resistant for outdoor use. The two-layer structure thus provides EM shielding (by virtue of the conductive mesh layer) as well as having a plastic layer to give ingress protection and/or shielding against other weather influences such as sun (solar load, solar radiation, heat), or hail (impact protection). The laminar structure gives a reduced weight compared to a full metal housing, but is stronger than a full plastic housing.

By way of example, the conductive mesh layer may comprise a metal layer (aluminum or steel) with a thickness in the range 0.5 mm-1.5 mm. A thinner carbon-based conductive material may instead be used, for example with a thickness below 1 mm. The plastic layer e.g. polycarbonate, has a thickness in the range 1 mm-3 mm.

The mesh layer is for example at the inner surface. This gives more options for the aesthetic appearance of the luminaire but it also means the mesh can function as an electrical ground, and the communications module and/or driver circuitry may connect electrically to the mesh layer. The mesh layer may then connect to other metal parts of the luminaire to provide thermal coupling to a heat sink.

Figure 4:
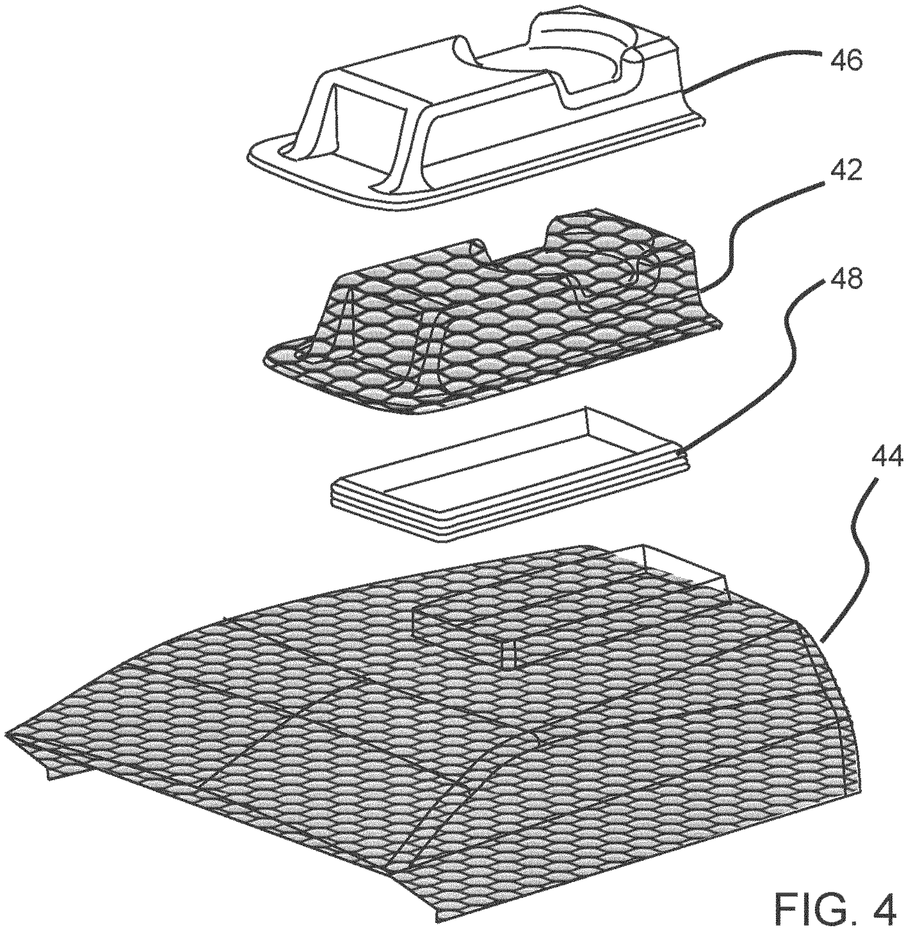
FIG. 4 shows an example of the design for the outer housing of the luminaire of FIG. 1.

FIG. 4 shows an example of the design for the outer housing of the luminaire of FIG. 1.

The base part 44 is formed as a first conductive mesh, for example also combined with a plastic layer as explained above, and the top part is formed as a mesh cover 42 and a plastic outer cover 46 over the mesh cover 42. The mesh cover 42 has a larger mesh opening size than the mesh used for from the base part 44. The mesh cover 42 covers substantially the entire communication module, i.e., the mesh cover 42 is not limited to (a part of) (the field of view of) the antenna of the communication module. The base part 44 provides EM shielding to EM sensitive electronics of the lighting driver. The mesh cover 42 may be a laminar plastic-mesh structure as explained above or there may be separate parts as shown.

A sealing gasket 48 is also shown. The outer housing may in this case be considered to comprise the combination of the top and base parts.

The top part 42, 46 provides a weatherproof environment for the communications module that is transparent for the RF signals of the communications module. The top part functions 42 as the first portion of the outer housing (which is transparent to the RF signal), and the base part 44 functions as the second portion of the outer housing.

Figure 5:
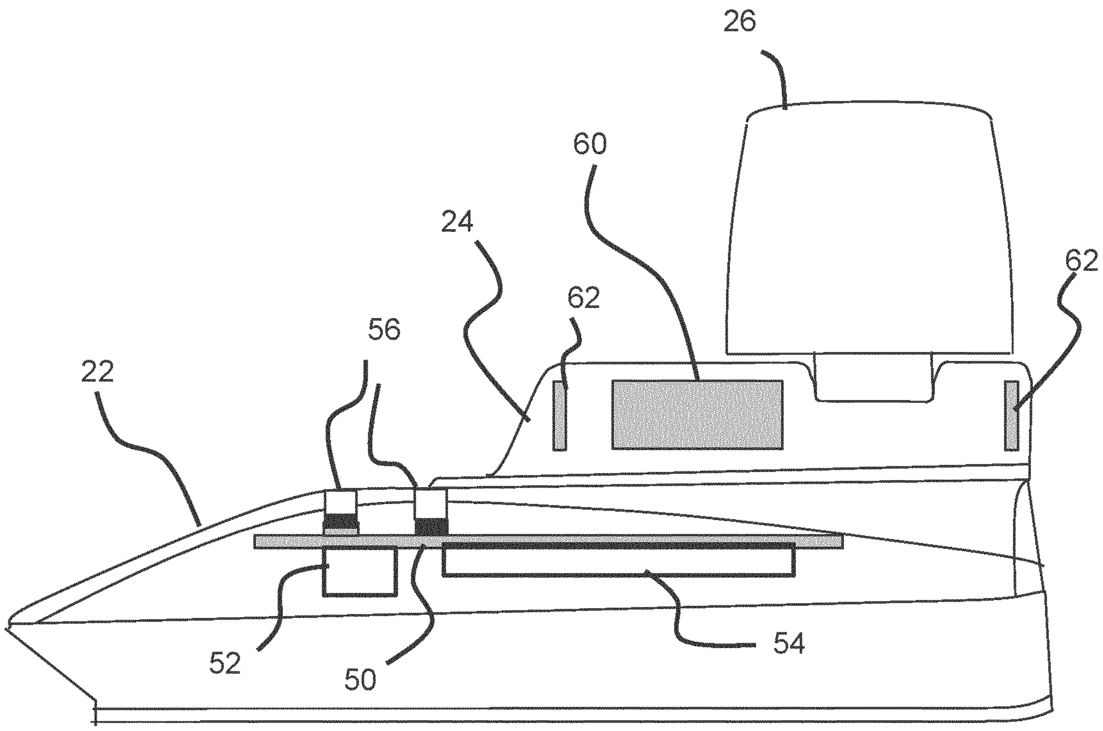
FIG. 5 shows the internal parts of the outer housing.

FIG. 5 shows the internal parts of the outer housing, comprising the LED board 50 and the driver circuitry 52 mounted on the LED board as well as the LEDs 54 themselves. They are in the base part 22 of the outer housing. The top part 24 of the outer housing contains the wireless communications module, which includes a RF signal processing circuit 60 as well as antenna boards 62, two of which are visible in FIG. 5. The antenna boards each carry an RF antenna, and together they provide a 360 degree radiation (and reception) pattern in a horizontal plane, in this example.

Thermal couplings 56 may be provided for coupling the circuitry in the base part to the outer housing to assist heat dissipation. In particular, thermal connection may be made to the mesh layer which is both electrically and thermally conductive.

In the example of FIG. 4, the bottom of the mesh cover 42 may be open. It does not need to be transparent to the RF signals, since the field of view is for example 360 degrees around a horizontal plane, and for example 20 degrees above and below that plane. Thus, the RF signals can be blocked by the mesh of the base part 44.

Figure 6:
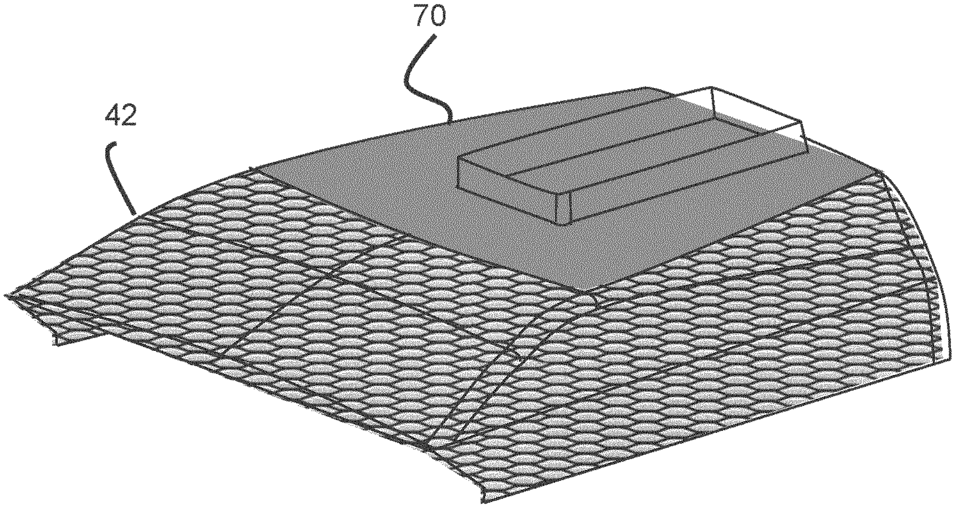
FIG. 6 shows that there may be a solid metal layer between the top and base parts of the outer housing.

As shown in FIG. 6, there may even be a solid metal layer 70 between the top and base parts of the outer housing. This may function as a block for solar radiation, or a thermal barrier. The thermal couplings 56 mentioned above for example provide a thermal coupling to the layer 70. The layer 70 may be an additional layer interposed between the top and base parts of the outer housing, or it may be a region where no mesh openings are formed, so it may be integral with the remainder of the mesh layer.

Some examples above have portions of the mesh which are solid. There may also be portions of the mesh which comprise only a conductive mesh layer. This feature may be used to provide ventilation, with the remaining portions of the mesh layer preventing debris entering the internal volume. The location of these openings will be chosen to avoid weather damage to the internal components.

The invention may be applied to various other luminaire designs. As the examples show, the wireless communications module may be mounted within a single outer housing or it may be in a separate enclosure which then forms part of the outer enclosure.

The term "luminaire" as used herein refers to an implementation or arrangement of one or more lighting units in a particular form factor, assembly, or package, wherein the luminaire's primary function is to provide illumination to its environment. Outdoor luminaires are luminaires adapted to be used in outdoor environments and adapted to provide, as their primary function, illumination to the outdoor environment.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A luminaire comprising:

an outer housing; and a wireless communications module mounted within a space enclosed by the outer housing, the wireless communications module including an antenna, the wireless communications module having an operating range of wavelengths, wherein the outer housing comprises at least first and second portions, wherein the first portion comprises an electrically conductive mesh with a first opening size to provide transparency to RF signals within the operating range of wavelengths, wherein at least a part of the electrically conductive mesh of the first portion is located aligned with a field of view of the antenna of the wireless communications module, and the second portion comprises an electrically conductive mesh with a second opening size, smaller than the first opening size.

2. The luminaire of claim 1, wherein the second portion comprises a solid electrically conductive layer.

3. The luminaire of claim 1, wherein the first and second portions of the outer housing each comprise a wall formed as:

a conductive mesh layer; and a plastic layer against the conductive mesh layer.

4. The luminaire of claim 3, wherein the plastic layer is UV resistant.

5. The luminaire of claim 3, wherein the first or second portions of the outer housing further comprises a portion comprising only the conductive mesh layer.

6. The luminaire of claim 3, wherein the conductive mesh layer comprises a metal layer with a thickness in the range 0.5 mm-1.5 mm or a carbon-based layer with a thickness below 1 mm, and the plastic layer has a thickness in the range 1 mm-3 mm.

7. The luminaire of claim 1, wherein the electrically conductive mesh of the first portion comprises an array of mesh openings having a maximum opening dimension larger than a largest wavelength of the operating range of wavelengths.

8. The luminaire of claim 1, wherein the transmission and reception wavelength corresponds to a wavelength in the band 57 GHz to 71 GHz.

9. The luminaire of claim 1, comprising a light source and a light source drive circuit, wherein the outer housing comprises a base part for housing the light source and light source drive circuit and a top part for housing the wireless communications module, wherein the top part includes the first portion and the base part includes the second portion.

10. The luminaire of claim 9, comprising a solid metal shielding layer between the base part and the top part.

11. The luminaire of claim 1, comprising a light source and a light source drive circuit, wherein the outer housing has an inner volume containing the light source, light source drive circuit and the communications module.

12. The luminaire of claim 1, wherein the wireless communications module comprises the antenna and a RF signal processing circuit.

13. The luminaire of claim 1, wherein the wireless communications module comprises an array of antenna boards, each carrying an antenna portion, wherein the antenna portions together define the antenna.

14. The luminaire of claim 13, wherein the antenna boards together extend fully around an axis.

* * * * *